(12) United States Patent
Kelly et al.

(10) Patent No.: US 8,135,859 B1
(45) Date of Patent: Mar. 13, 2012

(54) SYSTEM AND METHOD FOR PROVIDING INFRASTRUCTURE SERVICES WITHOUT A DESIGNATED NETWORK MANAGER

(75) Inventors: Stephen Thomas Kelly, Redmond, WA (US); John Ian Ferrell, Bellevue, WA (US); Jeff Baird Erwin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1515 days.

(21) Appl. No.: 11/039,744

(22) Filed: Jan. 19, 2005

(51) Int. Cl.
*G06F 15/16* (2006.01)
(52) U.S. Cl. .................................. 709/245; 709/201
(58) Field of Classification Search ............... 709/201, 709/245
See application file for complete search history.

(56) References Cited

U.S. PATENT DOCUMENTS

| | | | | |
|---|---|---|---|---|
| 5,862,346 A | * | 1/1999 | Kley et al. ............... | 709/245 |
| 6,167,446 A | * | 12/2000 | Lister et al. ............. | 709/223 |
| 6,611,867 B1 | * | 8/2003 | Bowman-Amuah ........ | 709/224 |
| 7,340,500 B2 | * | 3/2008 | Traversat et al. ......... | 709/201 |
| 2002/0035621 A1 | * | 3/2002 | Zintel et al. ............. | 709/220 |
| 2003/0005100 A1 | * | 1/2003 | Barnard et al. .......... | 709/223 |
| 2003/0069953 A1 | * | 4/2003 | Bottom et al. ........... | 709/223 |
| 2003/0097410 A1 | * | 5/2003 | Atkins et al. ............ | 709/206 |
| 2005/0066197 A1 | * | 3/2005 | Hirata et al. ............. | 713/201 |
| 2005/0093703 A1 | * | 5/2005 | Twitchell, Jr. ........... | 340/572.8 |
| 2005/0100029 A1 | * | 5/2005 | Das ......................... | 370/401 |
| 2005/0138173 A1 | * | 6/2005 | Ha et al. .................. | 709/225 |
| 2006/0059253 A1 | * | 3/2006 | Goodman et al. ......... | 709/223 |

* cited by examiner

*Primary Examiner* — George C Neurauter
(74) *Attorney, Agent, or Firm* — Merchant & Gould

(57) ABSTRACT

Infrastructure services such as addressing, directory services, performance monitoring, and diagnostic capabilities are shared among nodes of an ad-hoc mesh network without a designated network manager. A first mesh node creates parameters corresponding to the services to be provided. As each new mesh node joins the network, parameters are update, synchronized among the mesh nodes, and stored in a virtual database shared by the mesh nodes. For some of the services such as performance monitoring, a designated representative may be elected by a group of mesh nodes once a predetermined number of connected mesh nodes is exceeded. The representative nodes may share performance monitoring information among themselves and act as redundant back-up servers.

20 Claims, 10 Drawing Sheets

SYSTEM AND METHOD FOR PROVIDING INFRASTRUCTURE SERVICES WITHOUT A DESIGNATED NETWORK MANAGER

BACKGROUND OF THE INVENTION

Peer-to-peer communication between devices is becoming a more prevalent and accepted method of providing network communication. A peer-to-peer network is a network loosely bound by connections in a group of computing devices that allows the computing devices to share resources directly. There are many peer-to-peer networks that have been created on the backbone of other network infrastructures. These network infrastructures usually include some level of management, whether the infrastructure is the Internet or another local network. The management often takes the form of one or more servers responsible for addressing destinations on the network and routing the information to these destinations. The addressing scheme may use one or more of several different protocols to address destinations and route information. For example, one network infrastructure protocol is DHCP (Dynamic Host Configuration Protocol). DHCP is an Internet protocol for automating the configuration of computers that use TCP/IP. DHCP can be used to automatically assign IP addresses, to deliver TCP/IP stack configuration parameters such as the subnet mask and default router, and to provide other configuration information such as the addresses for time servers. Traditionally, a network using DHCP is managed by a dedicated computing device referred to a DHCP server.

Traditional models, such as a network using standard DHCP, fail when no infrastructure yet exists. The idea of ad-hoc, self-forming peer-to-peer networks that do not require any prior network infrastructure or administration is relatively new with many hurdles to overcome. One of the hurdles is how to provide an addressing scheme when dedicated computing devices are not provided on the peer-to-peer network to manage addressing.

SUMMARY OF THE INVENTION

Embodiments of the present invention relate to a system and method for providing a shared network service for a self-forming mesh network. In accordance with one aspect of the present invention, a number of mesh boxes, or mesh nodes, are combined to form a mesh network (wherein a mesh network is one type of a peer-to-peer network that includes mesh boxes acting as the cooperative members of the network). The mesh network allows transfer of data between mesh nodes and clients connected to the mesh nodes without the requirement of pre-existing network structure elements (i.e., dedicated servers, etc.).

In accordance with one aspect of the present invention, a computer-implemented method for cooperatively managing network services in the absence of a designated network services manager is provided. The method includes identifying cooperative members on a network, synchronizing at least one parameter of shared network services with the other cooperative members if other cooperative members exist, otherwise creating the at least one parameter of the shared network services. The method further includes updating the at least one parameter of the shared network services when a new member joins the network, updating the at least one parameter of the shared network services when a member leaves the network, and sharing the updated parameter with other members in the network.

In accordance with another aspect of the present invention, a computer-implemented method for cooperatively managing network services in the absence of a designated network services manager is provided. The method includes identifying cooperative members on a network, synchronizing at least one parameter of the performance monitoring services with the other cooperative members if other cooperative members exist, otherwise creating the at least one parameter of the performance monitoring services. The method further includes updating the at least one parameter of the performance monitoring services when a new member joins the network, updating the at least one parameter of the performance monitoring services when a member leaves the network, and sharing the updated parameter with at least one other member in the network.

In accordance with a further aspect of the present invention, a computer-readable medium that includes computer-executable instructions for cooperatively managing network services in the absence of a designated network services manager is provided. The computer-executable instructions include identifying cooperative members on a network, synchronizing at least one parameter of shared network services with the other cooperative members if other cooperative members exist, otherwise creating the at least one parameter of the shared network services. The instruction further include updating the at least one parameter of the shared network services when a new member joins the network, updating the at least one parameter of the shared network services when a member leaves the network, and sharing the updated parameter with other members in the network.

In accordance with still another aspect of the present invention, a system for cooperatively managing network services in the absence of a designated network services manager includes a mesh network having mesh nodes included therein, and a logical server distributed across the mesh network that is configured to execute a set of computer-executable instructions on each of the mesh nodes. On each of the mesh nodes, the server configuration identifies neighboring mesh nodes on the mesh network by broadcasting a notification message that determines whether other mesh nodes are within communication range of the current mesh node, obtains network parameters corresponding to any neighboring mesh nodes, wherein the network parameters include at least one of an address allocation, a security parameter, a performance monitoring parameter, determines a new network parameter for a current mesh node on the mesh network, and updates a shared collection of network parameters with the new network parameter by broadcasting an update message to the neighboring mesh nodes.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
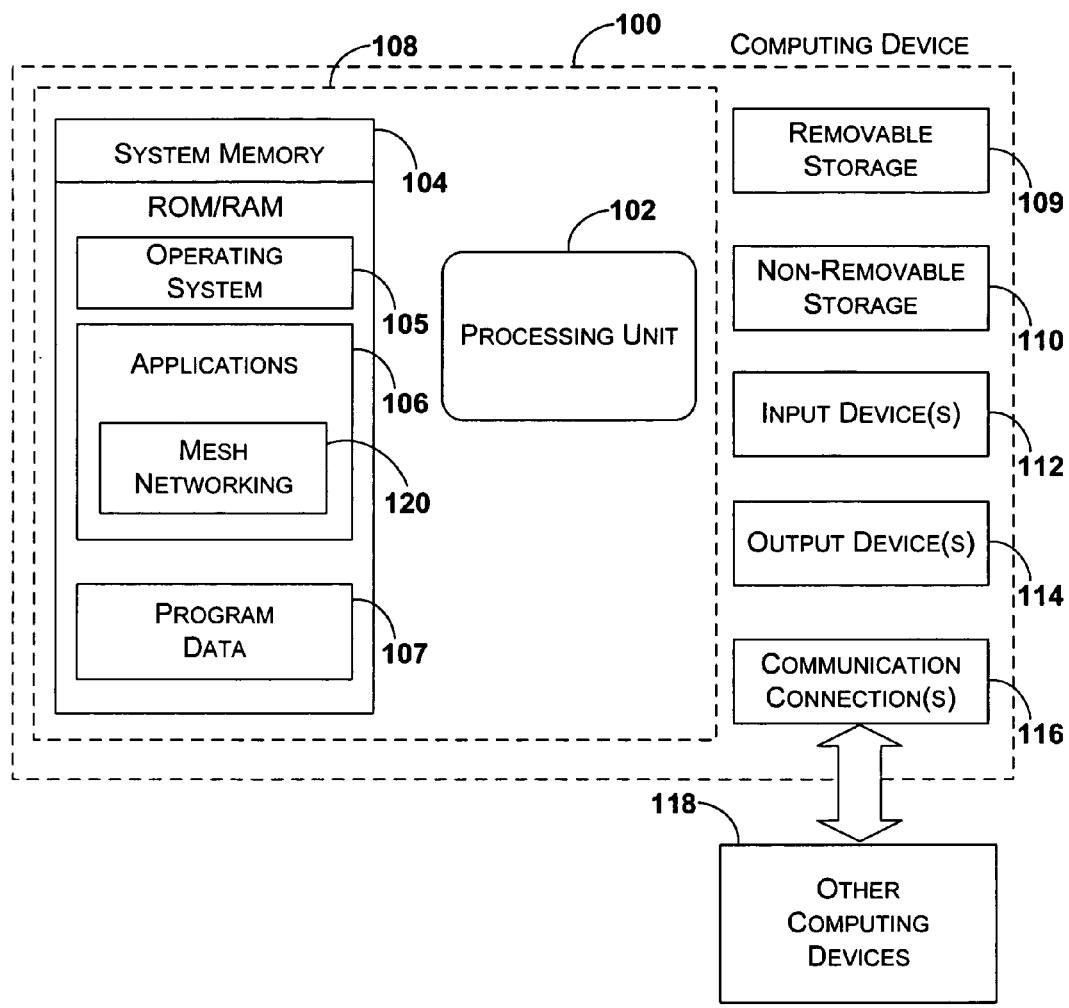
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further include an application 120 for implementing mesh networking functionality and/or a distributed server in accordance with the present invention. The functionality represented by application 120 may be further supported by additional input devices, 112, output devices 114, and communication connection(s) 116 that are included in computing device 100 for establishing and maintaining a mesh network.

Figure 2:
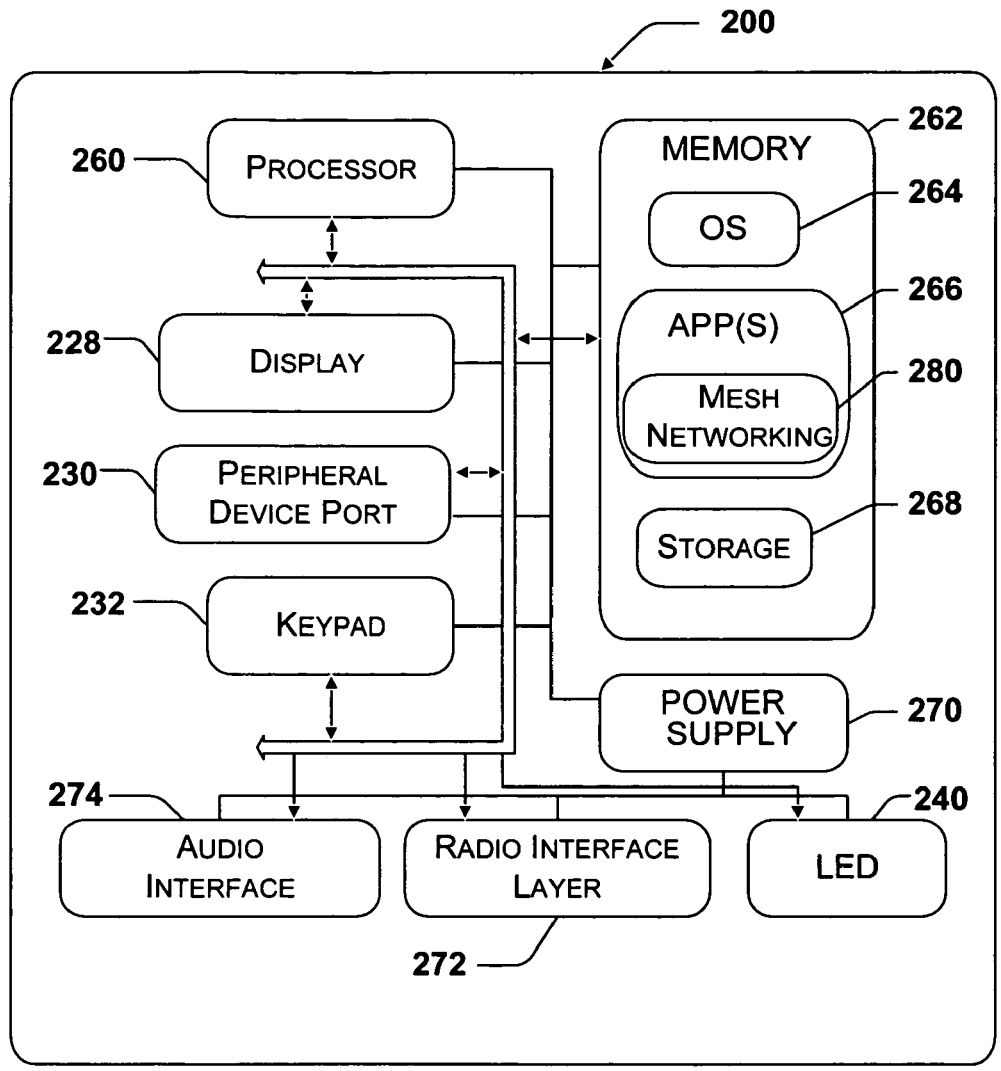
FIG. 2 illustrates an exemplary mobile device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

In one embodiment, applications 266 further include an application 280 for implementing mesh networking functionality and/or a distributed server in accordance with the present invention. The functionality represented by application 280 may be further supported by structure in radio interface layer 272 that is included in mobile device 200 for establishing and maintaining a mesh network.

Figure 3:
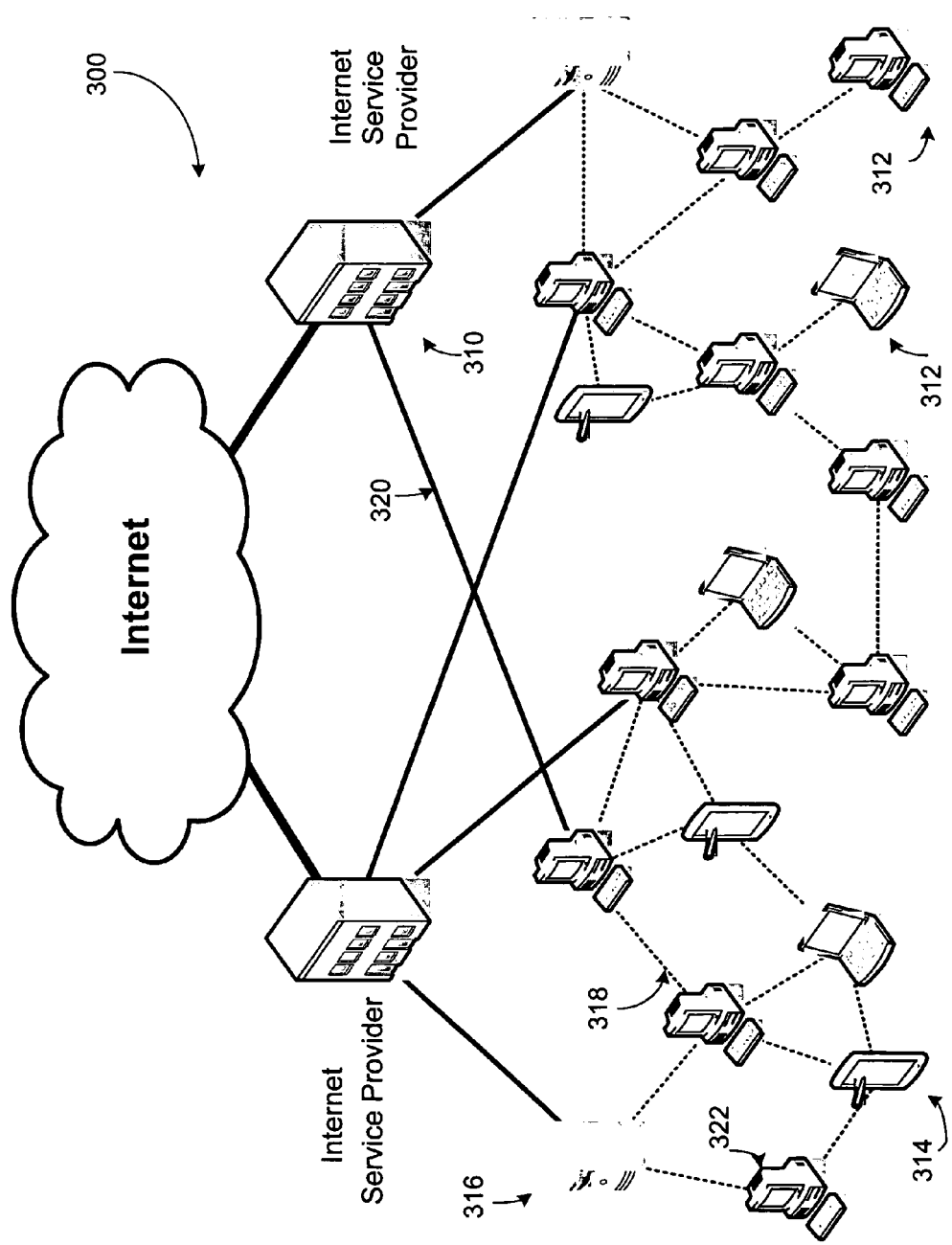
FIG. 3 illustrates an exemplary mesh network that may be used in one exemplary embodiment of the present invention.

FIG. 3 illustrates a mesh network 300 that may be used in one exemplary embodiment of the present invention. Mesh network 300 may comprise any topology of mesh nodes, Internet service providers, and communication media. Also, the mesh network 300 may have a static or dynamic topology without departing from the spirit and scope of the present invention.

The mesh network 300 includes one or more Internet service providers 310, which provide Internet access points for one or more mesh nodes. Each mesh node may comprise any device that is connected to the mesh network 300. The mesh node may transmit and receive data packets and also may pass data packets to other mesh nodes in accordance with the routing protocol of the mesh network 300. The mesh node may be a fixed device or a mobile device. For example, the mesh node may include a computing device 312 that is similar to computing device 100 described above in conjunction with FIG. 1. The mesh node may also include a mobile computing device 314 that may be similar to mobile computing device 200 described above in conjunction with FIG. 2. Other embodiments may include other configurations of mesh nodes. For example, a mesh node may include a dedicated computer that only routes data packets from one mesh node to another such as the mesh box 316.

In one exemplary embodiment of the present invention, the mesh network 300 has a network topology in which mesh nodes are connected with several redundant connections between the mesh nodes. The mesh network 300 may include a full mesh where every mesh node is connected to every other mesh node in the mesh network. Mesh network 300 may also include a partial mesh topology where some mesh nodes are organized in a full mesh and other mesh nodes are only connected to one or two other mesh nodes. Other mesh topologies may include one or more client subnets connected to the mesh network. These client subnets may have a plurality of clients connected thereto. For example, the client subnets may include a set of computing devices connected to a particular mesh box through a network connection other than the mesh network. These clients in the subnet gain access to other resources by routing data traffic through the mesh box to the mesh network. Accessing the mesh network through the mesh box allows the client devices to gain access to the Internet and other resources with the mesh box managing the routing of the data. The various topologies for the mesh network 300 are endless and will not be further set forth herein.

Reference number 318 indicates communication media between the mesh nodes. By way of example, and not limitation, communication media 318 may include wired media such as a wired network or direct-wired connection, and wireless media such as acoustic, RF, infrared and other wireless media. Reference number 320 indicates communication media between Internet service provider 310 and one or more of the mesh nodes. The communication media 320 may include wired media such as a wired network or direct-wired connection, and wireless media such as acoustic, RF, infrared and other wireless media.

Illustrative Embodiments for Providing
Infrastructure Services in the Absence of a
Designated Network Manager Embodiments of the present invention are related to distributing the network services management of an ad-hoc network across multiple computing devices included on the network without a designated network manager. For example, a network may include one or more mesh boxes, or mesh nodes. These mesh nodes are configured to self-form a wireless network with other mesh boxes within a particular range. Many of these mesh nodes may provide a connection to the mesh network for a number of client computing devices. Other mesh nodes may provide Internet egress points to the computing devices connected to the mesh network. The present invention describes a method whereby multiple computers in a peer-to-peer system work cooperatively to provide a service heretofore implemented as a managed service on a designated server.

In one embodiment, a shared managing scheme is used to inform the mesh nodes of the state of the network parameters and changes thereto. The scheme allows the mesh nodes to be coordinated to manage a number of network parameters such as addressing, naming, directory services, performance monitoring, diagnostic capabilities, and the like, without the use of administrators or dedicated servers.

Figure 4:
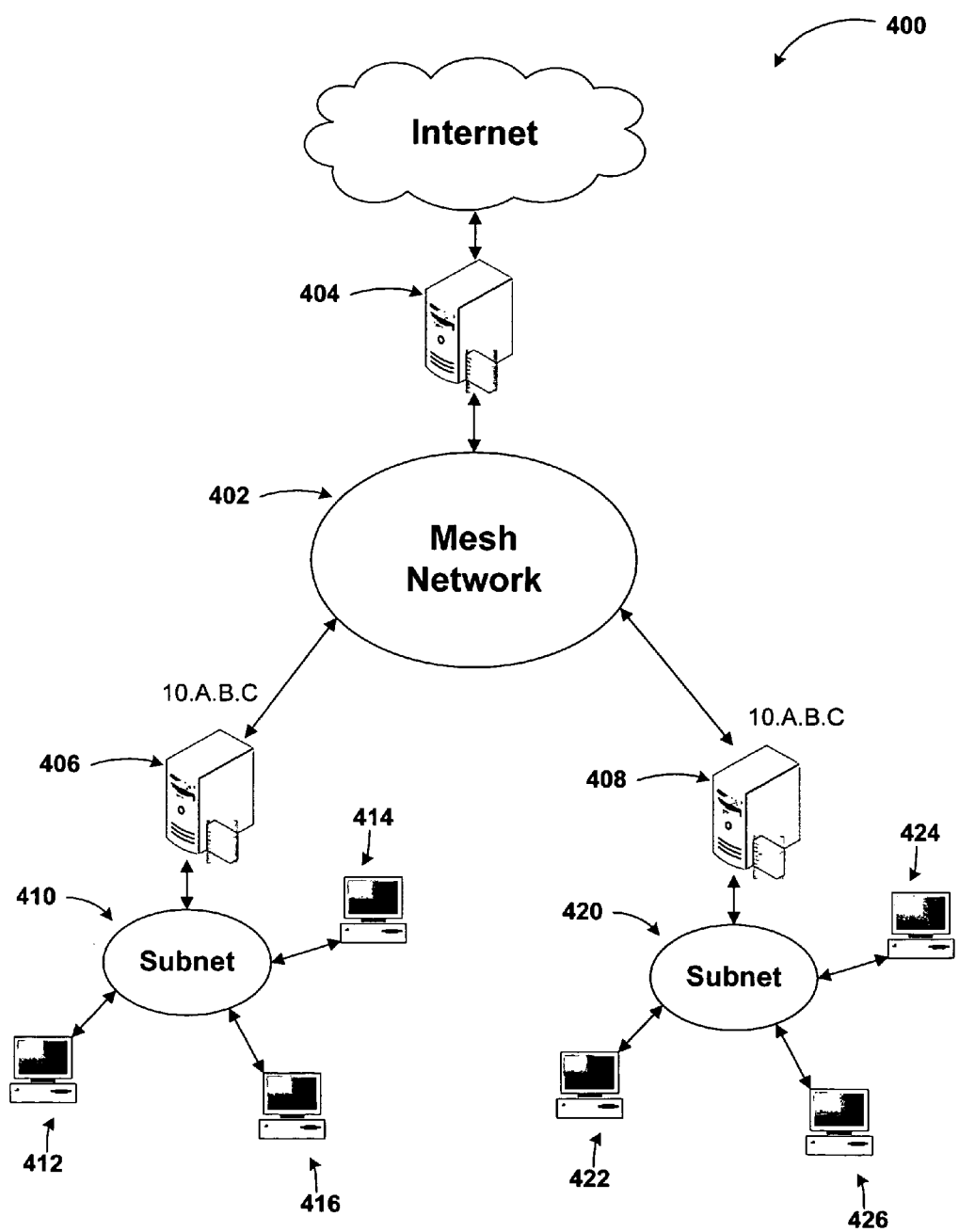
FIG. 4 illustrates an exemplary two-layer mesh network that may be used in one exemplary embodiment of the present invention.

FIG. 4 illustrates an exemplary two-layer mesh network that may be used in one exemplary embodiment of the present invention. System 400 includes mesh network 402 that may be in a peer-to-peer (P2P) configuration, computing devices (e.g., mesh boxes) 404, 406, 408, client subnets 410, 420, and client computing devices 412, 414, 416, 420, 422, 426.

As new devices (e.g., 406) are added to mesh network 402, they are configured to take advantage of a provided portion of the network, or to provide self-determined parameters to the network. In a self-forming and self-managing mesh network, the concept of a single network manager is not easily feasible. A network manager requires that an individual (e.g., administrator) set it up and administer it. In mesh network 402, there is no administrator, no single point of control, and no network infrastructure to rely on for network services. The present invention serves mesh network 402 from multiple locations and multiple devices (e.g., 406) on mesh network 402. The devices (e.g., 406) that self-form to create mesh network 402, also provide network services to their client computing devices (e.g., 412) while operating from a single, distributed virtual database. As an example, in a self-forming mesh network (e.g., network 402), the mesh boxes (e.g., 406) discover each other, authenticate each other, and form the mesh network. The mesh network is configured according to the present invention to allow clients (e.g., 412) connected to one mesh box (e.g., 406) to communicate with clients (e.g., 422) attached to another mesh box (e.g., 408) somewhere on the mesh. Each mesh box (e.g., 406) may supply IP (Internet Protocol) addresses to its clients (e.g., 412). The clients may then communicate with other clients attached to other mesh boxes having their own IP addresses provided by their respective mesh boxes.

In one embodiment, the shared network parameter may be DHCP addressing and mesh boxes may create amongst themselves a single logical DHCP server based on a protocol, similar to core backbone router protocols, whereby the mesh boxes act on a single logical DHCP database. Mesh boxes are able to allocate addresses for themselves and for clients connected to them. Addresses may be chosen from the private network space. When the database for a mesh sub-network is created, a value is chosen at random for the second position. All nodes within that mesh sub-network use that randomly chosen value in the second position. For example, if the value 213 is chosen, then all nodes in the mesh sub-network have addresses starting with XX.213. A subnet mask for this example is 255.255.0.0. Other values and subnet mask values may be selected without departing from the spirit or scope of the present invention.

In another embodiment, the shared network parameter may be a security parameter such as a certificate. Starting with the first mesh box, each device coming on-line may be asked to perform a security scan and assigned a certificate upon successful security scan. A virtual database shared among the mesh boxes may contain certificate information for all devices on the network. A scope of the security scan may be determined by the collective network management. For example, an initial requirement for the security scan may include authentication of each new device only. At a later time point, a device may join the network and request that an additional scan parameter be included such as a virus scan. The virtual database may be updated to include virus scan information from that point on and require all new devices asking to join the network to provide virus scan results.

Figure 5:
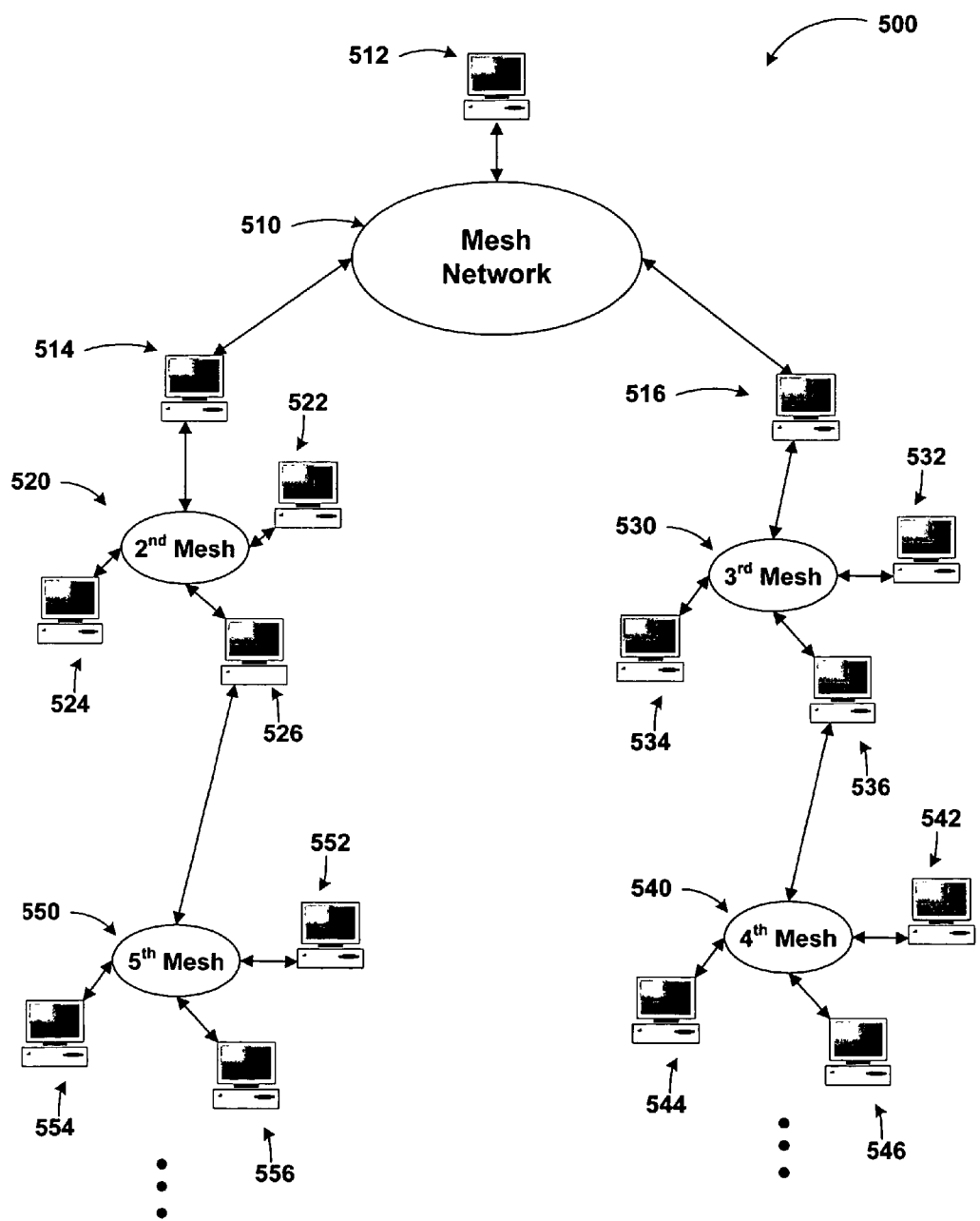
FIG. 5 illustrates an exemplary N-layer mesh network that may be used in one exemplary embodiment of the present invention.

FIG. 5 illustrates an exemplary N-layer mesh network that may be used in one exemplary embodiment of the present invention.

System 500 includes mesh network 510 that may be in a P2P configuration, computing devices (e.g., mesh boxes) 512, 514, and 516 directly coupled to mesh network 510. System 500 further includes 2nd mesh network 520 with computing devices 522, 524, and 526 directly coupled to mesh network 520. Mesh network 520 is coupled to mesh network 510 through mesh box 514. 3rd mesh network 530 includes computing devices 532, 534, and 536 directly coupled to 3rd mesh network 530. 3rd mesh network 530 is coupled to mesh network 510 through mesh box 516.

System 500 further includes another layer of mesh networks 540 and 550 with respective exemplary computing devices 542, 544, 546, and 552, 554, 556. Mesh networks 540 and 550 couple to 2nd mesh network 520 and 3rd mesh network 530 through computing devices 526 and 536, respectively.

Computing devices and networks shown in FIG. 5 operate substantially likewise to similarly numbered devices and networks in FIG. 4. The shared network management aspects of the present invention may be expanded to N-layers of mesh networks similar to those shown in FIG. 5. At each level a mesh box may act as a member of the shared network management scheme. In another embodiment, a mesh box coupling a sub-network to a higher level network may also act as a designated network manager for the sub-network, while participating in the shared management of the higher network.

As new devices (e.g., 556) are added to mesh network, they are configured to take advantage of a provided portion of the network, or to provide self-determined parameters to the network. In an additional embodiment, using the present addressing scheme allows an algorithm to be implemented that allows mesh boxes to select between available Internet egress points. When a mesh box hands out an address to a corresponding client computing device, the mesh box gives its own client facing address as the default gateway. Thus, the client is not required to change any of its configuration information based on changes to the egress point.

Figure 6:
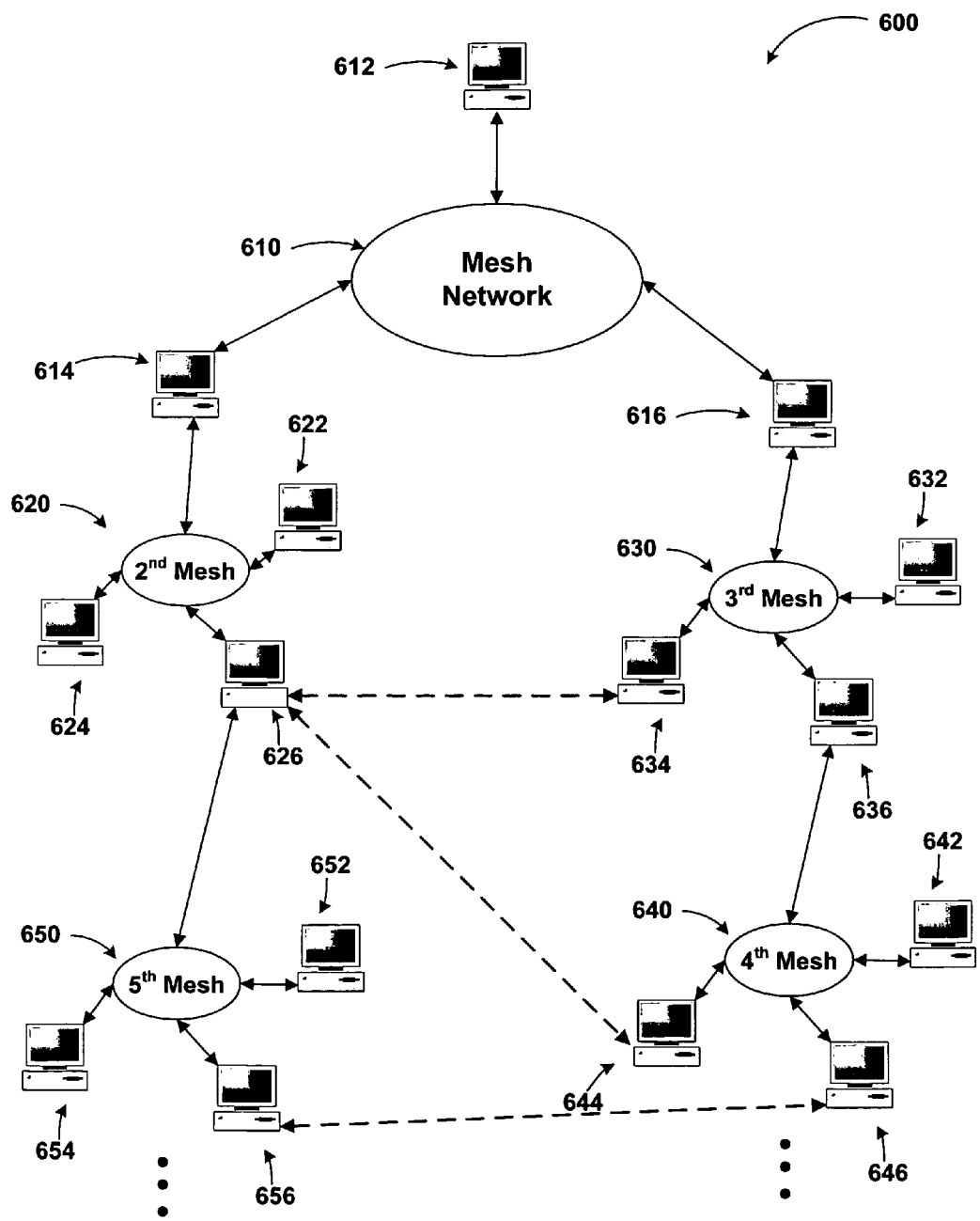
FIG. 6 illustrates an exemplary N-layer mesh network with cross-connections between subnetworks that may be used in one exemplary embodiment of the present invention.

FIG. 6 illustrates an exemplary N-layer mesh network with cross-connections between subnetworks that may be used in one exemplary embodiment of the present invention.

A layered network combination with up to N layers is described above in conjunction with FIG. 5. Mesh networks 610-650 and corresponding computing devices of each network operate similar to likewise numbered networks and computing devices in FIG. 5.

The embodiment illustrated in FIG. 6 aims to underscore another level of expansion according to one aspect of the present invention. The embodiment shown in FIG. 5 illustrates individual mesh networks that may manage shared network parameters at each level and in a vertical configuration with higher level networks. The invention is not limited to this exemplary configuration, however. As shown in FIG. 6, sub-networks at any level may also interact with sub-networks of similar or different levels. For example, device 626 of second layer mesh network 620 may interact with device 634 of another second layer mesh network (630) and with device 644 of third layer mesh network 640.

According to one embodiment, mesh boxes at each sub-network may be configured to synchronize with mesh boxes of other sub-networks and cooperatively manage the networks. Because not all network parameters may be needed for an interaction between two or more sub-networks, a number of cooperatively managed network parameters for combination of sub-networks may be different.

For example, two sub-networks may interact and cooperatively manage their network parameters including Internet egress, security certificates, addressing, and the like. A third sub-network that interacts with one of the original sub-networks and does not need to have Internet access may only participate in the management of network parameters excluding Internet egress. Thus, each shared management scheme may be custom-configured depending on the interacting sub-networks' needs.

Figure 7:
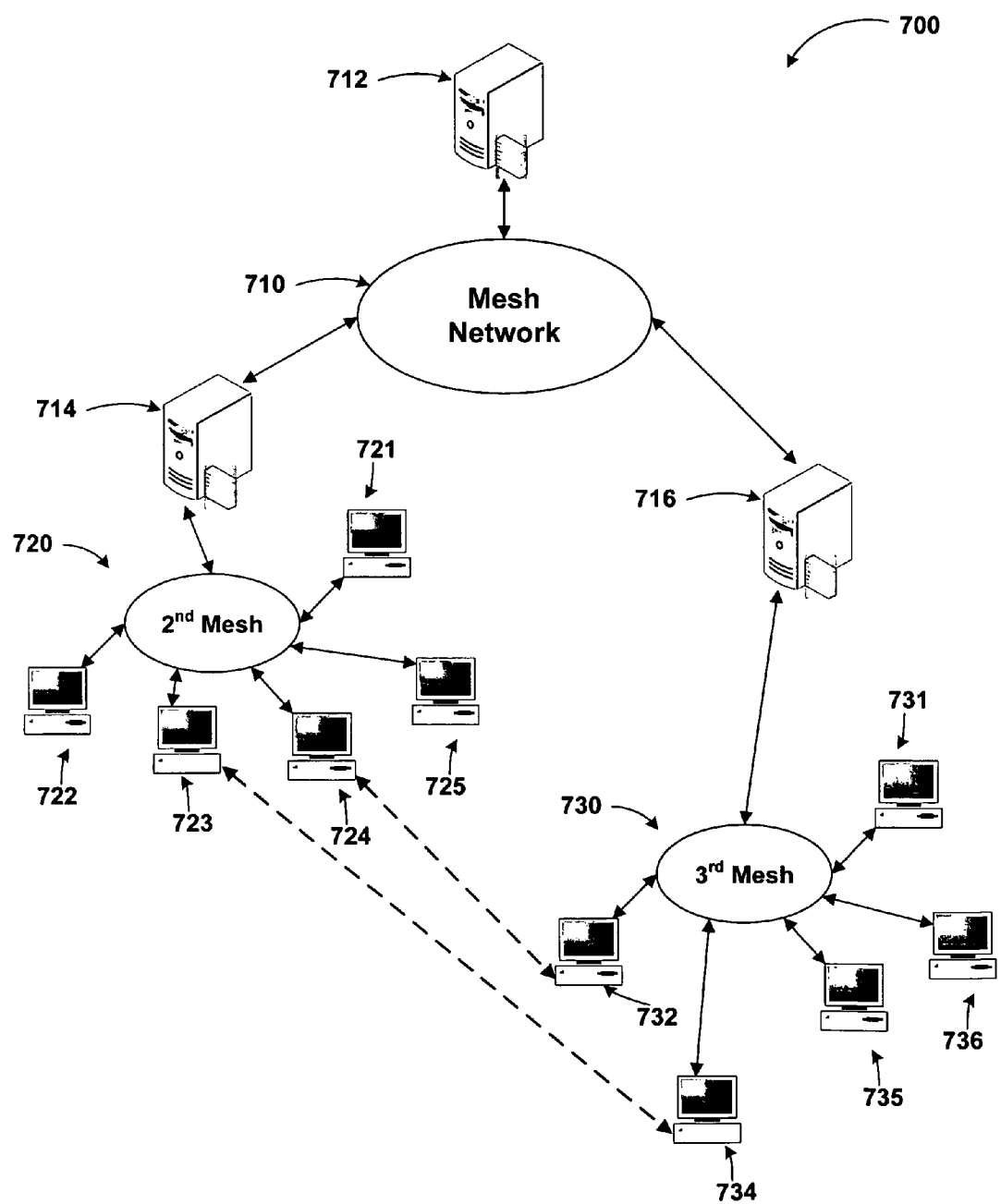
FIG. 7 illustrates an exemplary topology of a multi-layer mesh network with shared performance monitoring according to one embodiment of the present invention.

FIG. 7 illustrates an exemplary topology of a multi-layer mesh network with shared performance monitoring according to one embodiment of the present invention.

As described in previous figures, one of the network parameters cooperatively managed by the participating members (nodes) of a network may be performance monitoring. Frequently the system for monitoring the performance of the network becomes one of the most complex applications running on the network, hence it may become a burden on the administrator unto itself. This is because the administrator may have to decide what an acceptable number of leaf nodes is for a single piece of middleware to manage. Additionally, in large enterprises, it is important to keep this kind of data so it may also be stored in a database for later historical trending and analysis.

A system according to one embodiment of the present invention chooses data collection points and allows viewing of the resultant data from anywhere in the network without having to know where the data is currently being analyzed.

System 700 includes top level mesh network 710 and lower level mesh networks 720 and 730. Computing devices 712, 714 and 716 are nodes of mesh network 710. Lower level mesh networks 720 and 730 interact with mesh network 710 through nodes 714 and 716. Nodes 721-725 of mesh network 720 and nodes 731-735 of mesh network 730 may also interact with each other directly.

In an operation, a first node (e.g. 714) attempts to find other nodes upon boot-up. If the first node finds that there are no other on the network, it may designate itself as the representative of the group (since it's the only one who could represent the group).

When a second node (e.g. 716) comes up and looks for other nodes, it finds that node 714 is online and is the designated representative. At this point they could optionally negotiate for node 716 to take over for the group based on a metric or simply leave the status quo. The decision process happens automatically without an administrator's intervention.

Over time other nodes come online and go through the same process. The nodes may follow a scheme for deciding that the set of devices should be broken up so that no one node is left collecting and analyzing data for the entire set. Then, the nodes that have been elected representatives might exchange data among themselves for an even higher-level analysis or back-up protection.

If one of the representative nodes leaves the network for any reason, the other nodes may elect a new representative based on predetermined criteria. Through all of these changes, however, the nodes themselves may use P2P communications to understand who is collecting data and to decide where they should be sending their performance data.

Figure 8:
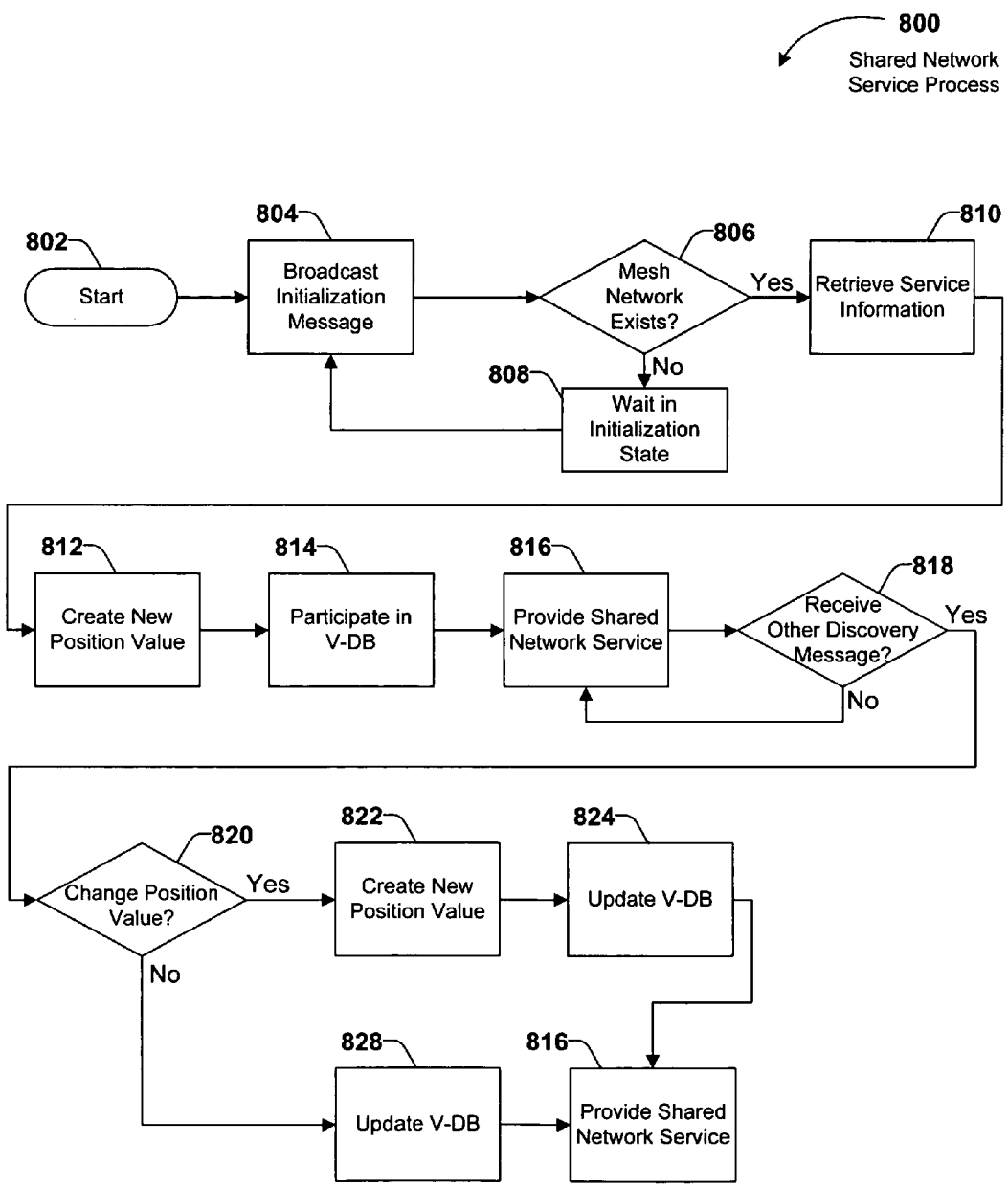
FIG. 8 illustrates an exemplary logical flow diagram of a shared network management process in accordance with the present invention.

FIG. 8 illustrates an exemplary logical flow diagram of a shared network management process in accordance with the present invention. Process 800 starts at block 802 where a mesh node or mesh box is powered up on a mesh network (e.g., P2P network 410 shown in FIG. 4). The mesh node may have one or more client computing devices networked through a client subnet. After the mesh node is powered up and connected to the mesh network, processing continues at block 804.

At block 804, an initialization message is broadcast to any additional mesh nodes that are in range of the current mesh node. The initialization message may include default parameters selected by the mesh box for its initial state such as an IP address, initial performance parameters, and the like. In one embodiment, the range is such that the current mesh node and the other mesh nodes are considered neighbors, or immediately connected with one another. In another embodiment, the initialization message includes a position value that corresponds to a subnet address associated with the mesh box. Once the initialization message is broadcast, processing continues at decision block 806.

At decision block 806, a determination is made whether a mesh network exists. This may be accomplished by determining whether the current mesh box has received any discovery messages from other mesh boxes while in the initialization state. If a discovery message is not received from another mesh box, processing moves to block 808 to wait in the initialization state. However, if a discovery message is received, processing advances to block 810.

At block 810, network service information is retrieved from one or more existing nodes on the network. As described above, such information may include addressing information, directory information, security parameters, performance monitoring information, and the like. Processing then proceeds to block 812.

At block 812, a new position value is created for the mesh box. According to a predetermined rule, the mesh box may assign itself new default parameters or accept a set of parameters assigned by the existing mesh network. Processing moves to block 814 next.

At block 814, the mesh box participates in the shared virtual database. In a network cooperatively managed by its members, information associated with the management of the network such as system parameters, performance monitoring data, directory information, and the like, may be stored in a virtual database shared among the members. For example, each member may contribute a portion of its hard disk space to the virtual database. In another embodiment, the virtual database may exist completely in Random Access Memory (RAM), or in another form. Each time a new member joins, the virtual database of all members may be updated with the changed information such as the new member's new position value. Processing then proceeds to block 816.

At block 816, the new member of the network beings to provide shared network service in cooperation with other existing members of the network. Processing advances to decision block 818.

At decision block 818, a determination is made whether a new discovery message is received. If the decision is negative, processing returns to block 816. However, if the decision is affirmative indicating the joining of a new member, processing proceeds to decision block 820.

At decision block 820, a determination is made whether the position value of the current member is to be changed based on the joining of the new member. If the decision is negative, processing moves to block 828 where the virtual database is updated with the information of the new member. From block 828 processing advances to block 816, where the cooperative management of the network is continued.

If the decision at block 820 is affirmative, a new position value is assigned to the current member. As explained before, default parameters of each member of the network may be changed each time a new member joins at block 822, or the new member may be assigned new value(s) upon joining the network. In this former case, the current member updates its parameters and the virtual database with the new position value (and any other management associated information) at block 824 following block 822.

Block 824 is followed by block 816, where the cooperative management of the network is continued.

Figure 9:
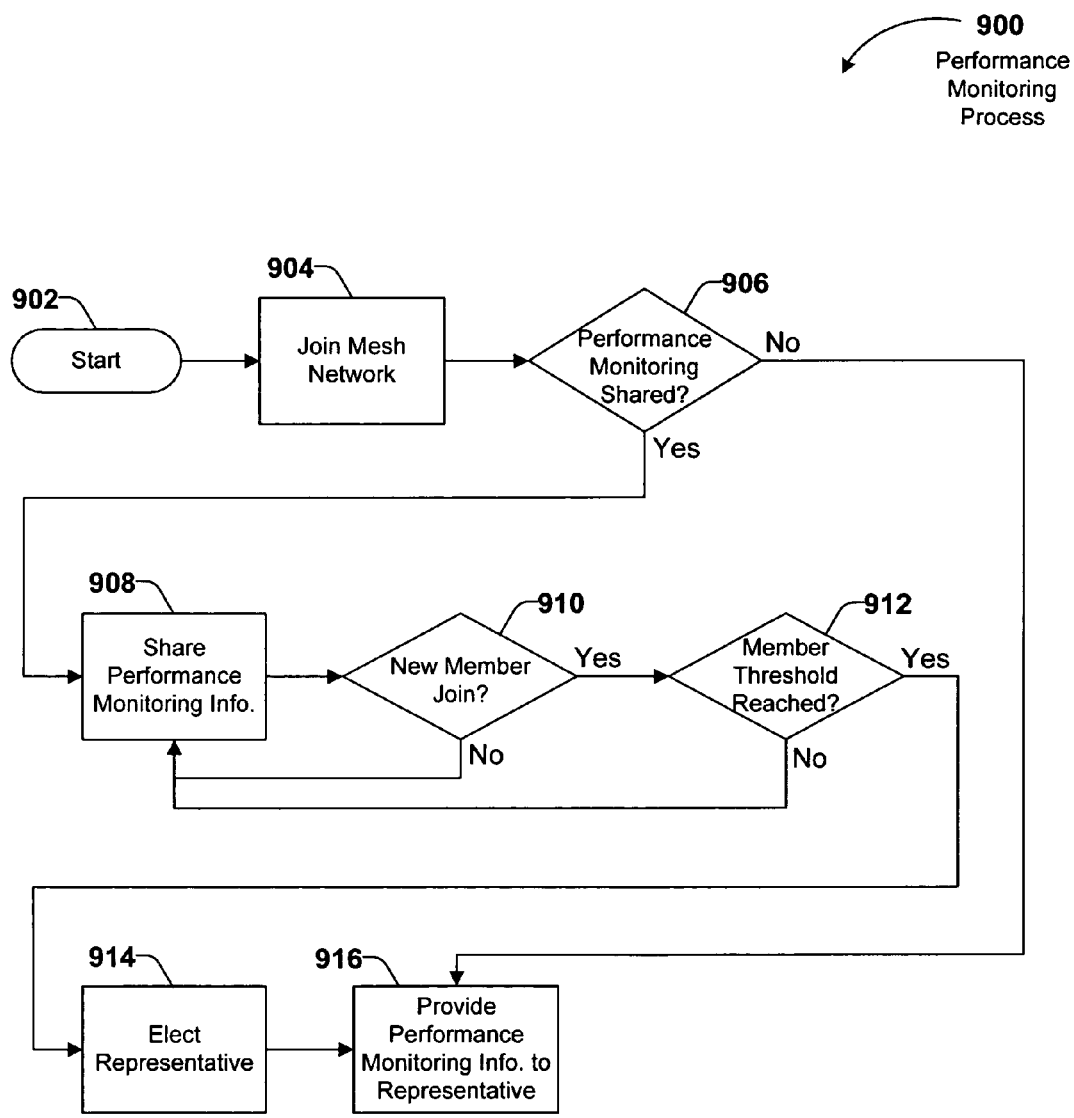
FIG. 9 illustrates an exemplary logical flow diagram of a performance monitoring process in accordance with the present invention.

FIG. 9 illustrates an exemplary logical flow diagram of a performance monitoring process in accordance with the present invention. Process 900 starts at block 902 where a group of computing devices is turned on and they are ready to provide performance monitoring information. Processing continues at block 904.

At block 904 the computing devices join a mesh network. The devices may follow all or part of the process described above in conjunction with FIG. 8 while joining the network. Processing then proceeds to decision block 906.

At decision block 906, a determination is made whether performance monitoring is shared in the mesh network. If the decision is negative, processing advances to block 914, where the computing devices elect a representative to monitor performance parameters. Processing moves to block 916 next.

At block 916, individual computing devices provide performance information to the elected representative for collection of performance data. The performance data may be analyzed by the elected representative, stored for further use, forwarded to a predetermined destination, and the like.

If the decision at block 906 is affirmative indicating that performance monitoring is shared in the mesh network, processing moves to block 908.

At block 908, performance monitoring information is shared among the members of the network as described above in conjunction with FIG. 7. The performance data may be analyzed collectively by the members, stored in a virtual database for further use, forwarded to a predetermined destination, and the like. Processing then proceeds to decision block 910.

At decision block 910, a determination is made whether a new member has joined the mesh network. This may be accomplished by receiving a discovery message. If the decision is negative, processing returns to block 908 for further shared performance monitoring. If the decision is affirmative, processing proceeds to decision block 912.

At decision block 912, a determination is made whether a predetermined member threshold is reached. As discussed previously, a number of members in a network collectively monitoring the performance of the members of the network may reach a value, where it is impractical or impossible to perform the task with reasonable use of the resources. The threshold for such a number may be predetermined or determined by the members based a set of dynamic parameters such as processor capacity, memory use, network traffic, and the like. If the decision at block 912 is negative, processing returns to block 908 for further shared performance monitoring.

If the decision at block 912 is affirmative indicating the threshold has been reached, processing proceeds to decision block 914, where a representative is elected for the group and tasked with monitoring performance data for the whole group. In a large network or group of networks multiple representatives may be elected, which in return may share performance monitoring tasks among themselves. Such representative may also act as back-up servers for each other.

Figure 10:
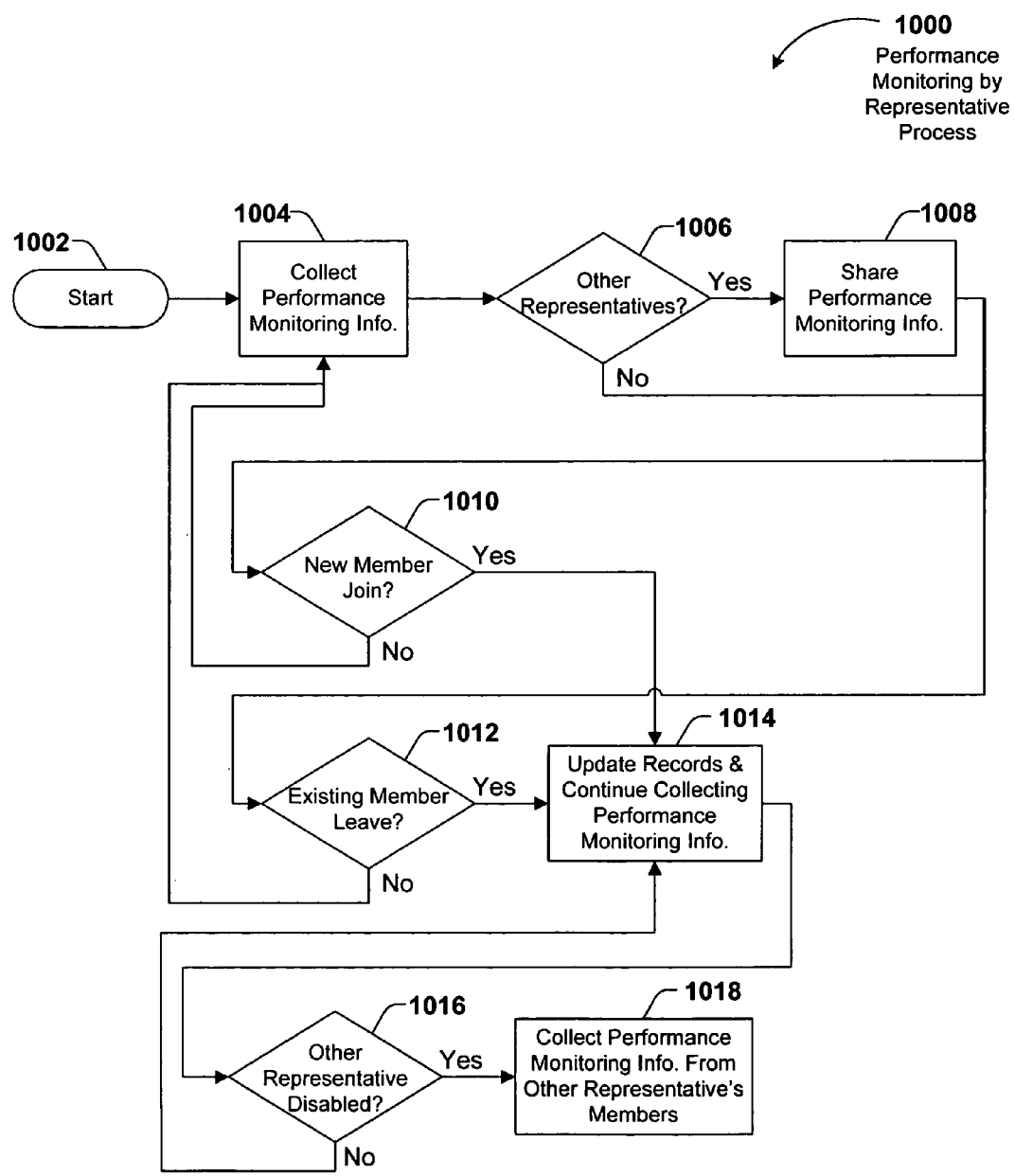
FIG. 10 illustrates an exemplary logical flow diagram of a performance monitoring process with representatives in accordance with the present invention.

FIG. 10 illustrates an exemplary logical flow diagram of a performance monitoring process with representatives in accordance with the present invention. Process 1000 starts at block 1002, where a representative computing device (e.g. a mesh box, mesh node) is configured to provide performance monitoring. Processing continues at block 1004.

At block 904 the representative mesh box collects performance monitoring information from devices associated with the mesh box such as computing devices in a subnet coupled to the mesh box. Processing advances to decision block 1006.

At decision block 1006, a determination is made whether other representative exist in the network to share performance monitoring. If the decision is affirmative, processing advances to block 1008, where performance monitoring tasks are shared among the representative members. This may involve employing a virtual database as described previously. If the decision is negative, block 1008 is skipped. In either case, processing moves to decision blocks 1010 and 1012 next.

Decision block 1010 represents the case when a new member joins the network. Decision block 1012 represents the situation when a member leaves the network. At block 1010 a determination is made whether a new member has joined. If the decision is negative, processing returns to block 1004. If the decision is affirmative, processing advances to block 1014.

At decision block 1012, a determination is made whether an existing member has left the network. If the decision is negative, processing returns to block 1004. If the decision is affirmative, processing advances to block 1014.

At block 1014, records are updated similar to the updating process of FIG. 8. A new position value may be assigned to the new member of all members, default security parameters may be modified, and the like. Upon updating the status of network management with the new membership information, the representative(s) continues to collect performance monitoring information and process the information. Processing move to decision block 1016 next.

Decision block 1016 may be skipped if only one representative exists. If multiple representative collectively monitor performance, a determination is made whether one or more of the representatives is disabled at decision block 1016. In one embodiment, the representative may be configured to act as back-up devices of each other. If the decision is negative, processing returns to block 1014. If the decision is affirmative, processing proceeds to block 1018.

At block 1018, currently active representative(s) take over collection and processing of performance monitoring data from the disabled representative(s) preventing a disruption of performance monitoring process in the network.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for cooperatively managing network services in the absence of a designated network services manager, comprising:

on a first computing device identifying cooperative members on a network;

if other cooperative members exist, obtaining at least one parameter of shared network services from a representative designated by the other cooperative members, wherein the representative is one of the other cooperative members, else designating the first computing device as a representative, and on the first computing device creating the at least one parameter of the shared network services; wherein the shared network services comprise addressing and naming services that are implemented without the designated network services manager, wherein the parameter comprises a network address parameter comprising a randomly chosen number within a position of the network address parameter; wherein the network address parameter is used by each of the cooperative members on the network to allocate and create network addresses for themselves and for clients connected to them; wherein each of the cooperative members use the randomly chosen number within their address;

when a new member joins the network, automatically negotiating between the representative and the new member to determine when the new member is designated as at least one of: the representative and an additional representative;

updating the at least one parameter of the shared network services when the new member joins the network;

updating the at least one parameter of the shared network services when a member leaves the network; and sharing the updated parameter with other members in the network.

2. The computer-implemented method of claim 1, wherein identifying cooperative members on the network further comprises identifying mesh boxes on a mesh network.

3. The computer-implemented method of claim 1, wherein identifying cooperative members on the network further comprises broadcasting an initialization message that determines whether other cooperative members are within communication range of the current cooperative member.

4. The computer-implemented method of claim 1, wherein synchronizing the at least one parameter of the shared network services with the other cooperative members includes:
retrieving the at least one parameter of the shared network services from existing members; and
creating a new position value for the current member.

5. The computer-implemented method of claim 4, wherein synchronizing the at least one parameter of the shared network services with the other cooperative members further includes:
participating in a shared virtual database for network services.

6. The computer-implemented method of claim 5, wherein participating in the shared virtual database for network services includes;
making storage space available to other members of the network for the virtual database; and
storing information associated with the at least one parameter of the shared network services in the virtual database.

7. The computer-implemented method of claim 6, updating the at least one parameter of the shared network services includes:
changing the position value when at least one of a member leaves and a new member joins; and
updating the virtual database with the changed position value.

8. The computer-implemented method of claim 1, wherein the at least one parameter of the shared network services includes at least a security parameter, an active directory, a shared storage, and a performance monitoring parameter.

9. The computer-implemented method of claim 1, wherein at least one parameter of the shared network services is shared among all cooperative members, and wherein at least another parameter of the shared network services is processed by a designated member.

10. The computer-implemented method of claim 1, wherein the cooperative members are arranged to form sub-networks that are coupled to each other through at least one designated cooperative member.

11. The computer-implemented method of claim 1, wherein the shared network services are associated with a performance monitoring service.

12. The computer-implemented method of claim 11, further comprising:
tracking a number of the members whose performance is being monitored;
if the number exceeds a predetermined threshold, electing a representative member as a designated performance monitoring member; else
continuing to track the number of the members whose performance is being monitored.

13. The computer-implemented method of claim 11, further comprising:
electing at least two designated performance monitoring members, wherein each designated performance monitoring member is responsible for performance monitoring of a group of members of the network; and
sharing performance monitoring data between the designated performance monitoring members such that one designated performance monitoring member can take over performance monitoring tasks of another designated performance monitoring member if needed.

14. The computer-implemented method of claim 13, wherein each designated performance monitoring member is responsible for a group of members of the network such that the groups are exclusive.

15. The computer-implemented method of claim 13, wherein each designated performance monitoring member is responsible for a group of members of the network such that the groups have common members.

16. The computer-implemented method of claim 11, further comprising:
employing a virtual database to provide the performance monitoring services, wherein the virtual database is shared among designated members of the network.

17. A tangible computer-readable storage medium that includes computer-executable instructions for cooperatively managing network services in the absence of a designated network services manager, the instructions comprising:
a first computing device identifying cooperative members on a network;
if other cooperative members exist, obtaining at least one parameter of shared network services from a representative selected from the other cooperative members, else the first computing device creating the at least one parameter of the shared network services and designating the first computing device as the representative; wherein the shared network services comprise addressing and naming services that are implemented without the designated network services manager, wherein the parameter comprises a network address parameter comprising a randomly chosen number within a position of the network address parameter; wherein the network address parameter is used by the cooperative members on the network to allocate and create network addresses for themselves and for clients connected to them;
updating the at least one parameter of the shared network services when a new member joins the network;
when the new member joins the network, automatically negotiating between the representative and the new member to determine when the new member is designated as at least one of: the representative and an additional representative;
updating the at least one parameter of the shared network services when a member leaves the network; and
sharing the updated parameter with other members in the network.

18. The computer-readable storage medium of claim 17, wherein the at least one parameter of the shared network is performance monitoring data.

19. The computer-readable storage medium of claim 18, wherein the members of the network are mesh nodes, and synchronizing at least one parameter of shared network services with the other cooperative members comprises:
broadcasting a notification message to the neighboring mesh nodes, wherein the notification message includes and indicator that a position value has been allocated by the current mesh node.

20. A system for cooperatively managing network services in the absence of a designated network services manager, the system comprising:
a mesh network having mesh nodes included therein; and a logical server distributed across the mesh network that is configured to execute computer-executable instructions on a processor on each of the mesh nodes, the computer-executable instructions executing on the processor comprising:
identifying neighboring mesh nodes on the mesh network by broadcasting a notification message that determines whether other mesh nodes are within communication range of the current mesh node;
obtaining network parameters corresponding to any neighboring mesh nodes, wherein the network parameters include at least an address allocation that is used to allocate and create network addresses in the absence of the designated network services manager; wherein the address allocation comprises a randomly chosen number within a position of a network address parameter that is used by each of the mesh nodes as an address in the mesh network;
when there are not any neighboring mesh nodes for a mesh node, creating the network parameters on the mesh node and designating the mesh node as the representative of a new mesh node that becomes a neighbor to the mesh node;
when a new mesh node joins the network, automatically negotiating between the representative and the new mesh node to determine when the new mesh node is designated as at least one of: the representative and an additional representative;
determining a new network parameter for a current mesh node on the mesh network; and
updating a shared collection of network parameters with the new network parameter by broadcasting an update message to the neighboring mesh nodes.

* * * * *